(12) United States Patent
Liang

(10) Patent No.: US 8,962,739 B2
(45) Date of Patent: Feb. 24, 2015

(54) LIQUID CRYSTAL ALIGNMENT AGENT, AND LIQUID CRYSTAL ALIGNMENT FILM AND LIQUID CRYSTAL DISPLAY ELEMENT FORMED FROM THE LIQUID CRYSTAL ALIGNMENT AGENT

(75) Inventor: Yu-Hao Liang, Kaohsiung (TW)

(73) Assignee: Chi Mei Corporation, Tainan (TW)

( * ) Notice: Subject to any disclaimer, the term of this patent is extended or adjusted under 35 U.S.C. 154(b) by 427 days.

(21) Appl. No.: 13/467,811

(22) Filed: May 9, 2012

(65) Prior Publication Data

US 2012/0289633 A1   Nov. 15, 2012

(30) Foreign Application Priority Data

May 13, 2011   (TW) .............................. 100116843 A

(51) Int. Cl.
| | | |
|---|---|---|
| C08J 3/02 | (2006.01) | |
| C08K 5/34 | (2006.01) | |
| G02F 1/1337 | (2006.01) | |

(52) U.S. Cl.
CPC ........ G02F 1/1337 (2013.01); G02F 1/133723 (2013.01)
USPC .......................................... 524/501; 524/104

(58) Field of Classification Search
CPC .............................. C08K 5/3415; C08K 5/1515
USPC ....................................................... 524/501
See application file for complete search history.

(56) References Cited

U.S. PATENT DOCUMENTS

| | | | |
|---|---|---|---|
| 6,685,997 B1 * | 2/2004 | Murata et al. ................... | 428/1.2 |
| 2004/0031950 A1 | 2/2004 | Shimizu et al. | |
| 2011/0255042 A1 | 10/2011 | Hsueh | |
| 2011/0313126 A1 | 12/2011 | Hsueh | |
| 2012/0101224 A1 | 4/2012 | Tsai | |
| 2012/0162588 A1 | 6/2012 | Tsai | |

FOREIGN PATENT DOCUMENTS

| | | | |
|---|---|---|---|
| JP | 2-282726 A | | 11/1990 |
| JP | 3-179323 A | | 8/1991 |
| JP | 7-043725 A | | 2/1995 |
| JP | 7-110484 A | | 4/1995 |
| JP | 7-234410 A | | 9/1995 |
| JP | 10-333153 A | | 12/1998 |
| JP | 11-193345 A | | 7/1999 |
| JP | 2002-162630 A | | 6/2002 |
| JP | 2003-096034 A | | 4/2003 |
| JP | 2006-023344 A | | 1/2006 |
| JP | 2006-028098 A | | 2/2006 |
| JP | 2007009031 | * | 1/2007 |
| WO | WO-00/61684 A1 | | 10/2000 |
| WO | WO-2007/078153 A1 | | 7/2007 |

OTHER PUBLICATIONS

Translation of JP 2007-009031, Jan. 18, 2007.*
U.S. Appl. No. 13/572,350, filed Aug. 10, 2012, by Tsai, Tsung-Pei.

* cited by examiner

Primary Examiner — Hui Chin
(74) Attorney, Agent, or Firm — Jianq Chyun IP Office

(57) ABSTRACT

A liquid crystal alignment agent includes a polyamic acid dispersion and a polyimide dispersion. Viscosity of the polyamic acid dispersion and viscosity of the polyimide dispersion satisfy the following relationship:

$$V_{A-2} - V_{A-1} \geq 4 \text{ cps}$$

wherein
$V_{A-2}$ is viscosity of the polyimide dispersion measured at a solid content of 6 wt % at a temperature of 25° C., and
$V_{A-1}$ is viscosity of the polyamic acid dispersion measured at a solid content of 6 wt % at a temperature of 25° C.
A liquid crystal alignment film formed from the liquid crystal alignment agent and a liquid crystal display element including the liquid crystal alignment film are also disclosed.

10 Claims, 1 Drawing Sheet

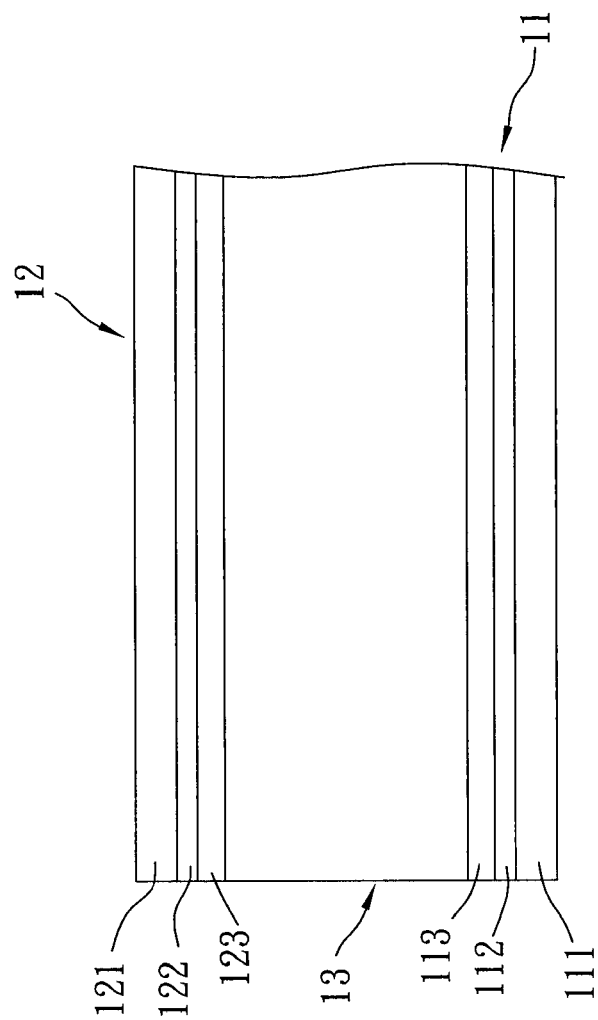

LIQUID CRYSTAL ALIGNMENT AGENT, AND LIQUID CRYSTAL ALIGNMENT FILM AND LIQUID CRYSTAL DISPLAY ELEMENT FORMED FROM THE LIQUID CRYSTAL ALIGNMENT AGENT

CROSS-REFERENCE TO RELATED APPLICATION

This application claims priority of Taiwanese Application No. 100116843, filed on May 13, 2011.

BACKGROUND OF THE INVENTION

1. Field of the Invention

This invention relates to a liquid crystal alignment agent, more particularly to a liquid crystal alignment agent having improved pretilt angle uniformity and process stability. The invention also relates to a liquid crystal alignment film formed from the liquid crystal alignment agent, and a liquid crystal display element including the liquid crystal alignment film.

2. Description of the Related Art

Nematic liquid crystal display elements are predominantly used in general liquid crystal display elements, and concrete examples of the nematic liquid crystal display elements actually used include: (1) a TN (Twisted Nematic) liquid crystal display element, in which a liquid crystal alignment direction of one side substrate is twisted at a 90 degree angle relative to a liquid crystal alignment direction of the other side substrate; (2) a STN (Super Twisted Nematic) liquid crystal display element, in which a liquid crystal alignment direction of one side substrate is twisted at an angle greater than 180 degrees relative to a liquid crystal alignment direction of the other side substrate; and (3) a TFT (Thin Film Transistor) liquid crystal display element which uses a thin film transistor. In the nematic liquid crystal display elements, the liquid crystal alignment is primarily controlled by a liquid crystal alignment film, and a pretilt angle of the liquid crystal relative to the liquid crystal alignment film is formed.

A liquid crystal alignment film is made from a liquid crystal alignment agent. Conventionally, the liquid crystal alignment agent is formulated by dissolving polyamic acid or polyimide in an organic solvent, and is then applied on a transparent conductive film formed on a substrate followed by baking treatment and alignment treatment to form the liquid crystal alignment film.

There is increasing demand for the displaying qualities of the liquid crystal display device. In order to develop a liquid crystal display device having improved performance, such as good response speed, high voltage holding ratio, and high reliability, JP 2-282726 discloses a liquid crystal alignment agent made of a specific polyamic acid compound and a liquid crystal alignment film made from the liquid crystal alignment agent, and JP 3-179323 discloses a liquid crystal alignment film formed from a liquid crystal alignment agent made of a specific polyamic acid compound. The liquid crystal alignment films disclosed in the prior art have high pretilt angle, and the liquid crystal display devices including the liquid crystal alignment films have improved response speed and reliability.

However, the requirement for the performance of the liquid crystal display device is growing more stringent recently because of the wide application of the liquid crystal display device of transmission type, reflection type, and transflection type, and because of a tendency toward the large-sized substrate, device, or production line. Although response speed, voltage holding ratio, and reliability are enhanced in the liquid crystal alignment films disclosed in the aforesaid prior art, there are still problems such as inferior pretilt angle stability and large variation of the pretilt angle in a liquid crystal alignment film, which result in disadvantage of defect (mura) appearance. Furthermore, there is also a problem of process instability, which results in a high defective rate.

SUMMARY OF THE INVENTION

Therefore, an object of the present invention is to provide a liquid crystal alignment agent which has improved alignment properties.

According to the first aspect of this invention, there is provided a liquid crystal alignment agent, which includes a polyamic acid dispersion and a polyimide dispersion. Viscosity of the polyamic acid dispersion and viscosity of the polyimide dispersion satisfy the following relationship:

$V_{A-2} - V_{A-1} \geq 4$ cps wherein $V_{A-2}$ is viscosity of the polyimide dispersion measured at a solid content of 6 wt % at a temperature of 25° C., and $V_{A-1}$ is viscosity of the polyamic acid dispersion measured at a solid content of 6 wt % at a temperature of 25° C.

According to the second aspect of this invention, there is provided a liquid crystal alignment film formed from the liquid crystal alignment agent of this invention.

According to the third aspect of this invention, there is provided a liquid crystal display element including the liquid crystal alignment film of this invention.

BRIEF DESCRIPTION OF THE DRAWING

Other features and advantages of the present invention will become apparent in the following detailed description of the preferred embodiments with reference to the accompanying drawing, of which:

FIG. 1 is a fragmentary schematic view of a preferred embodiment of a liquid crystal display element according to this invention.

DETAILED DESCRIPTION OF THE PREFERRED EMBODIMENTS

Liquid Crystal Alignment Agent:

The liquid crystal alignment agent of the present invention includes (A) a polymer mixture, and (B) an organic solvent for dissolving the polymer mixture, and is made by mixing (A-1) a polyamic acid dispersion with (A-2) a polyimide dispersion.

Polymer Mixture (A):

The polymer mixture includes at least one polyamic acid compound and at least one polyimide compound.

The polyamic acid dispersion is made by dispersing the polyamic acid compound in an organic solvent.

The polyimide dispersion is made by dispersing the polyimide compound in an organic solvent.

The organic solvent for the liquid crystal alignment agent may be the same as the organic solvent for the polyamic acid dispersion and/or the organic solvent for the polyimide dispersion.

Polyamic Acid Dispersion (A-1):

The polyamic acid in the polyamic acid dispersion is is obtained by subjecting a diamine compound and a tetracarboxylic dianhydride compound to a polymerization reaction.

Diamine Compound:

Examples of the diamine compound suitable for the present invention include aliphatic diamine compounds, alicyclic diamine compounds, and aromatic diamine compounds.

Examples of the aliphatic diamine compounds include, but are not limited to, 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-diaminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,11-diaminododecane, 1,12-diaminooctadecane, 1,2-bis(3-aminopropoxy)ethane, or the like.

Examples of the alicyclic diamine compounds include, but are not limited to, 4,4'-diaminodicyclohexylmethane, 4,4'-diamino-3,3'-dimethyldicyclohexylamine, 1,3-diaminocyclohexane, 1,4-diaminocyclohexane, isophoronediamine, tetrahydrodicyclopentadienylene diamine, tricyclic[6·2·1·0$^{2,7}$]-undecylenedimethylene diamine, 4,4'-methylenebis(cyclohexylamine), or the like.

Examples of the aromatic diamine compounds include, but are not limited to, 4,4'-diaminodiphenylmethane, 4,4'-diaminodiphenylethane, 4,4'-diaminodiphenylsulfone, 4,4'-diaminobenzanilide, 4,4'-diaminodiphenylether, 3,4'-diaminodiphenylether, 1,5-diaminonaphthalene, 5-amino-1-(4'-aminophenyl)-1,3,3-trimethylindane, 6-amino-1-(4'-aminophenyl)-1,3,3-trimethylindane, hexahydro-4,7-methanoindanylenedimethylene diamine, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,10-bis(4-aminophenyl)anthracene, 2,7-diaminofluorene, 9,9-bis(4-aminophenyl)fluorene, 4,4'-methylene-bis(2-chloroaniline), 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, 4,4'-bis[(4-amino-2-trifluoromethyl)phenoxy]octafluorobiphenyl, 5-[4-(4-n-pentylcyclohexyl)cyclohexyl]phenylmethylene-1,3-diaminobenzene, 1,1-bis[4-4-aminophenoxy)phenyl]-4-(4-ethylphenyl)cyclohexane, or the like.

In addition to the aforesaid examples of the diamine compounds, the diamine compound useful for the present invention includes the compounds represented by the following formulas (I-1)-(I-16):

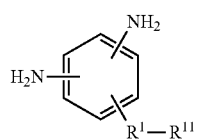

(I-1)

wherein $R^1$ represents —O—, —COO—, —OCO—, —NHCO—, —CONH—, or —CO—; $R^{11}$ represents a monovalent group having a group selected from the group consisting of a steroid skeleton, a trifluoromethyl group, a fluoro group, a $C_2$-$C_{30}$ alkyl group, and a nitrogen-containing cyclic structure derived from pyridine, pyrimidine, triazine, piperidine and piperazine,

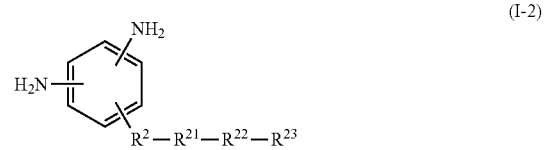

(I-2)

wherein $R^2$ represents —O—, —COO—, —OCO—, —NHCO—, —CONH—, or —CO—; $R^{21}$ and $R^{22}$ respectively represent a divalent group selected from the group consisting of an alicyclic group, an aromatic group, and a heterocyclic group; $R^{23}$ represents a $C_3$-$C_{18}$ alkyl group, a $C_3$-$C_{18}$ alkoxy group, a $C_1$-$C_5$ fluoroalkyl group, a $C_1$-$C_5$ fluoroalkoxy group, a cyano group, or a halogen atom,

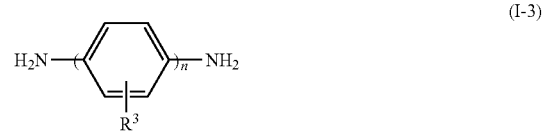

(I-3)

wherein $R^3$ represents hydrogen, a $C_1$-$C_5$ acyl group, a $C_1$-$C_5$ alkyl group, a $C_1$-$C_5$ alkoxy group, or halogen; $R^3$ in each repeating unit may be the same or different; and n is an integer ranging from 1 to 3,

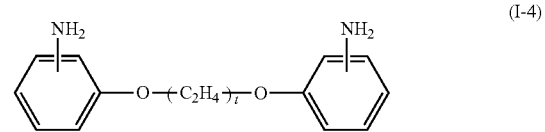

(I-4)

wherein t is an integer ranging from 2 to 12,

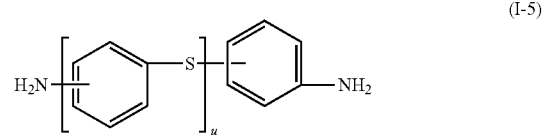

(I-5)

wherein u is an integer ranging from 1 to 5,

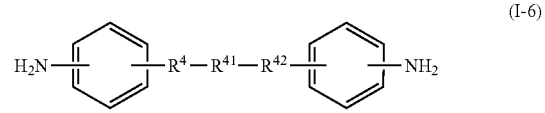

(I-6)

wherein $R^4$ and $R^{42}$ may be the same or different, and respectively represent a divalent organic group; and $R^{41}$ represents a divalent group that has a ring structure containing a nitrogen atom and that is derived from the group consisting of pyridine, pyrimidine, triazine, piperidine and piperazine,

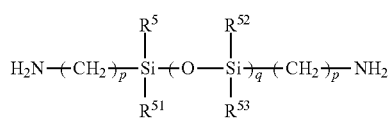
(I-7)

wherein $R^5$, $R^{51}$, $R^{52}$, and $R^{53}$ may be the same or different, and respectively represent a $C_1$-$C_{12}$ hydrocarbon group; p is an integer ranging from 1 to 3; and q is an integer ranging from 1 to 20,

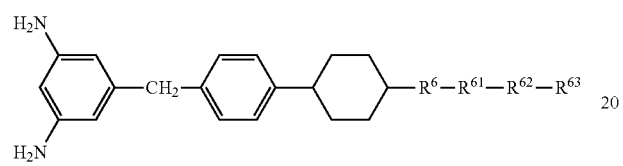
(I-8)

wherein $R^6$ represents —O— or cyclohexylene; $R^{61}$ represents —CH$_2$—; $R^{62}$ represents phenylene or cyclohexylene; and $R^{63}$ represents hydrogen or heptyl,

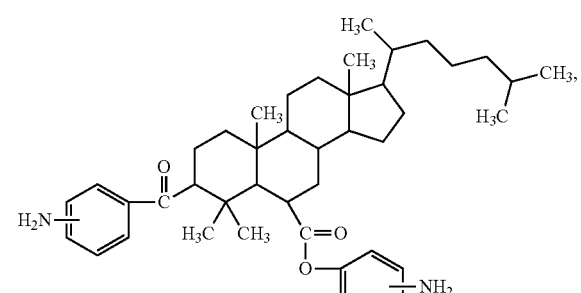
(I-9)

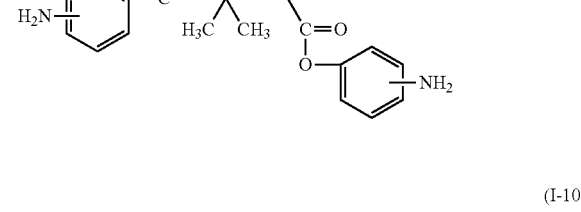
(I-10)

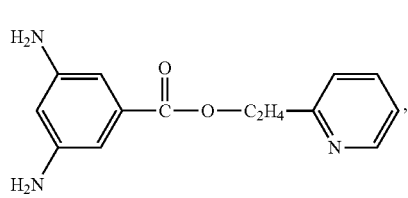
(I-11)

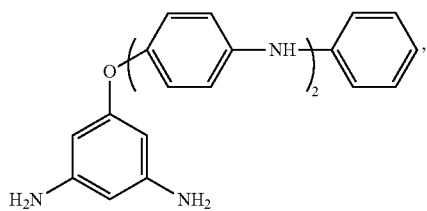
(I-12)

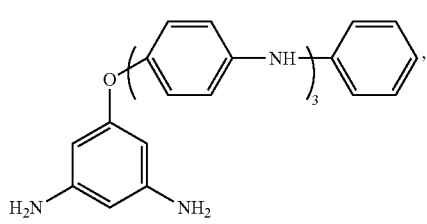
(I-13)

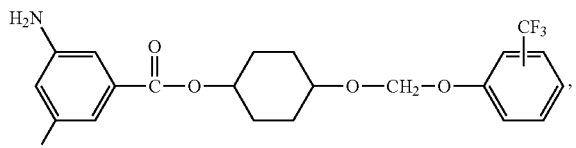
(I-14)

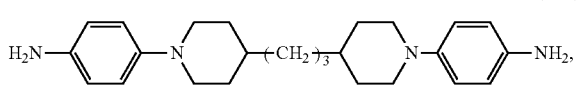
(I-15)

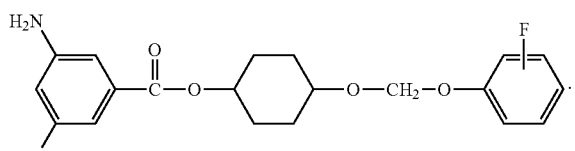
(I-16)

Preferred examples of the diamine compound represented by formula (I-1) include 2,4-diaminophenyl ethyl formate, 3,5-diaminophenyl ethyl formate, 2,4-diaminophenyl propyl formate, 3,5-diaminophenyl propyl formate, 1-dodecoxy-2,4-aminobenzene, 1-hexadecoxy-2,4-aminobenzene, 1-octadecoxy-2,4-aminobenzene,

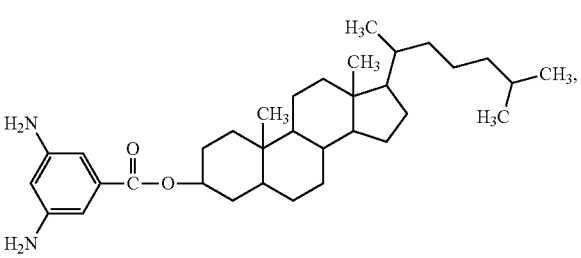
(I-1-1)

(I-1-2)
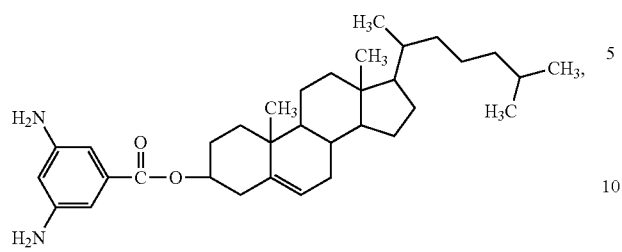
(I-1-3)
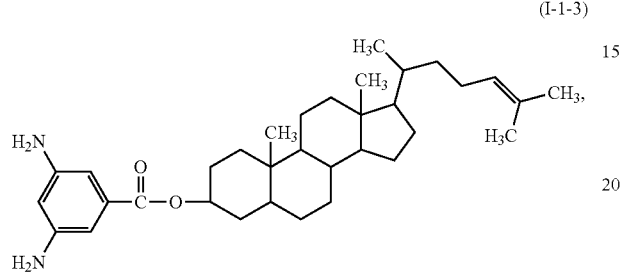
(I-1-4)
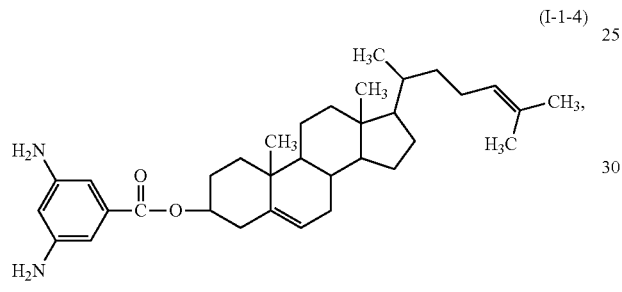
or the like.
Preferred examples of the diamine compound represented by formula (1-2) include
(I-2-1)
(I-2-2)
(I-2-3)
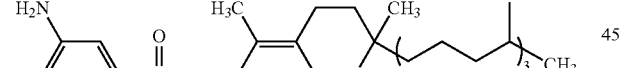
(I-2-4)
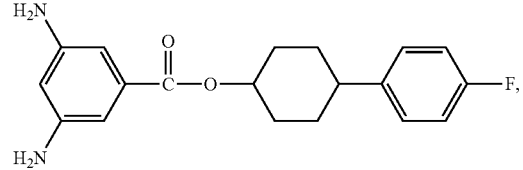
(I-2-5)
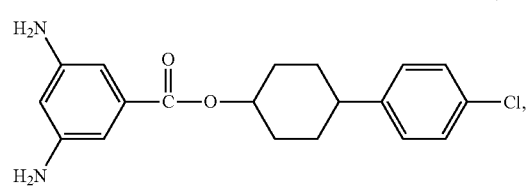
(I-2-6)
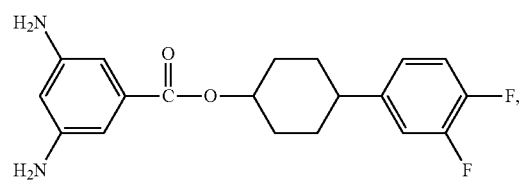
(I-2-7)
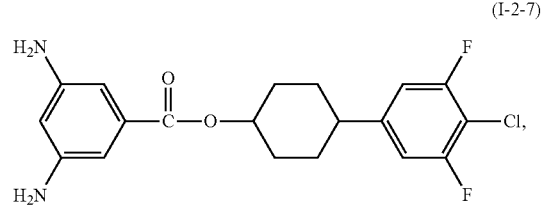
(I-2-8)
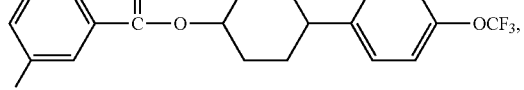
(I-2-9)
(I-2-10)

(wherein v represents an integer ranging from 3 to 12),

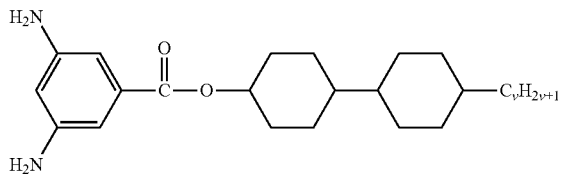
(I-2-11)

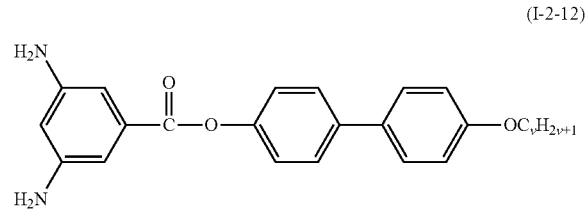
(I-2-12)

(wherein v represents an integer ranging from 3 to 12),

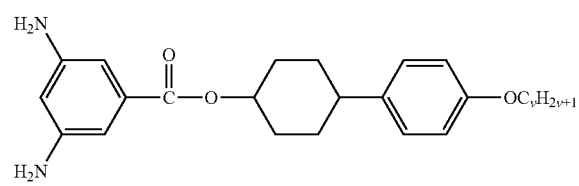
(I-2-13)

(wherein v represents an integer ranging from 3 to 12), or the like.

Preferred examples of the diamine compound represented by formula (I-3) include: (1) p-diaminobenzene, m-diaminobenzene, o-diaminobenzene, 2,5-diaminotoluene, or the like when n is 1; (2) 4,4'-diaminobiphenyl, 2,2'-dimethyl-4,4'-diaminobiphenyl, 3,3'-dimethyl-4,4'-diaminobiphenyl, 3,3'-dimethoxy-4,4'-diaminobiphenyl, 2,2'-dichloro-4,4'-diaminobiphenyl, 3,3'-dichloro-4,4'-diaminobiphenyl, 2,2',5,5'-tetrachloro-4,4'-diaminobiphenyl, 2,2'-dichloro-4,4'-diamino-5,5'-dimethoxybiphenyl, 4,4'-diamino-2,2'-bis(trichloromethyl)biphenyl, or the like when n is 2; and (3) 1,4-bis(4'-aminophenyl)benzene, or the like when n is 3. More preferably, the diamine compound represented by formula (I-3) is selected from p-diaminobenzene, 2,5-diaminotoluene, 4,4'-diaminobiphenyl, 3,3'-dimethoxy-4,4'-diaminobiphenyl, and 1,4-bis(4'-aminophenyl)benzene.

Preferably, the diamine compound represented by formula (I-5) is 4,4'-diaminodiphenylsulide.

Preferably, the diamine compound represented by formula (I-8) is selected from

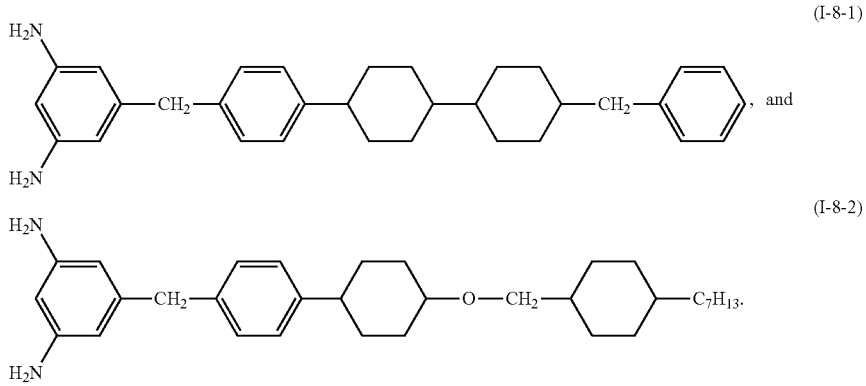

Preferred examples of the diamine compound suitable for the present invention include, but are not limited to, 1,2-diaminoethane, 4,4'-diaminodicyclohexylmethane, 4,4'-diaminodiphenylmethane, 4,4'-diaminodiphenylether, 5-[4-(4-n-pentylcyclohexyl)cyclohexyl]phenylmethylene-1,3-diaminobenzene, 1,1-bis[4-4-aminophenoxy)phenyl]-4-(4-ethylphenyl)cyclohexane, 2,4-diaminophenylformic acid ethyl ester, the diamine compounds represented by formulae (I-1-1), (I-1-2), (I-2-1), and (I-2-11), p-diaminobenzene, m-diaminobenzene, o-diaminobenzene, the diamine compound represented by formula (I-8-1), or the like.

The aforesaid diamine compounds may be used alone or in admixture of two or more.

Tetracarboxylic Dianhydride Compound:

Tetracarboxylic dianhydride compounds suitable for the present invention include aliphatic tetracarboxylic dianhydride, alicyclic tetracarboxylic dianhydride, and aromatic tetracarboxylic dianhydride. These teracarboxylic dianhydride compounds may be used alone or in admixture of two or more.

Examples of aliphatic tetracarboxylic dianhydride include, but are not limited to, ethanetetracarboxylic dianhydride, butanetetracarboxylic dianhydride, or the like.

Examples of alicyclic tetracarboxylic dianhydride include, but are not limited to, 1,2,3,4-cyclobutanetetracarboxylic dianhydride, 1,2-dimethyl-1,2,3,4-cyclobutanetetracarboxylic dianhydride, 1,3-dimethyl-1,2,3,4-cyclobutanetetracarboxylic dianhydride, 1,3-dichloro-1,2,3,4-cyclobutanetetracarboxylic dianhydride, 1,2,3,4-tetramethyl-1,2,3,4-cyclobutanetetracarboxylic dianhydride, 1,2,3,4-cyclopentanetetracarboxylic dianhydride, 1,2,4,5-cyclohexanetetracarboxylic dianhydride, 3,3',4,4'-dicyclohexanetetracarboxylic dianhydride, cis-3,7- dibutylcycloheptyl-1,5-diene-1,2,5,6-tetracarboxylicdianhydride, 2,3,5-tricarboxylcyclopentylacetic dianhydride, bicyclo[2.2.2]-octa-7-ene-2,3,5,6-tetracarboxylic dianhydride, or the like.

Examples of aromatic tetracarboxylic dianhydride include, but are not limited to, 3,4-dicarboxy-1,2,3,4-tetrahydronaphthalene-1succinic acid dianhydride, pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3'-4,4'-biphenylethanetetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-diphenyltetracarboxylic dianhydride, bis(phthalic acid) phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenylether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl)propane-bis(anhydrotrimellitate), 2,3,4,5-tetrahydrofurantetracarboxylicdianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-5-ethyl-5-(tetrahydro-2,5-dioxo-3-furanyl)-naphtho[1,2-c]-furan-1,3-dione, 1,3,3a,4,5,9b-hexahydro-7-methyl-5-(tetrahydro-2,5-dioxo-3-furanyl)-naphtho[1,2-c]-furan-1,3,-dione, 1,3,3a,4,5,9b-hexahydro-7-ethyl-5-(tetrahydro-2,5-dioxo-3-furanyl)-naphtho[1,2-c]-furan-1,3,-dione, 1,3,3a,4,5,9b-hexahydro-8-methyl-5-(tetrahydro-2,5-dioxo-3-furanyl)-naphtho[1,2-c]-furan-1,3-dione, 1,3,3a,4,5,9b-hexahydro-8-ethyl-5-(tetrahydro-2,5-dioxo-3-furanyl)-naphtho[1,2-c]-furan-1,3-dione, 1,3,3a,4,5,9b-hexahydro-5,8-dimethyl-5-(tetrahydro-2,5-dioxo-3-furanyl)-naphtho[1,2-c]-furan-1,3-dione, 5-(2,5-dioxotetrahydrofuranyl)-3-methyl-3-cyclohexene-1,2-dicarboxylic dianhydride, or the like.

In addition to the aforesaid examples of the tetracarboxylic dianhydride, other examples of the tetracarboxylic dianhydride useful for the present invention include the compounds represented by the following formulas (II-1)-(II-6):

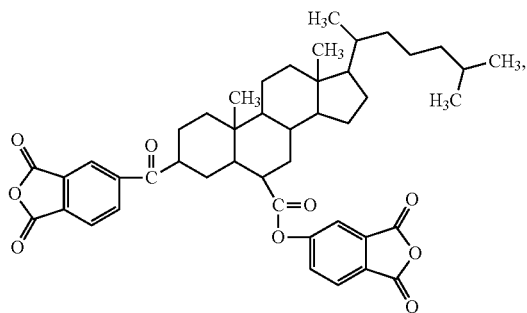
(II-1)

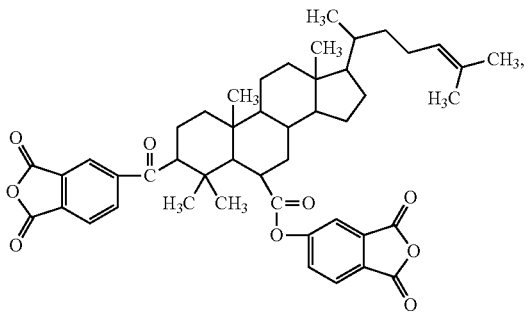
(II-2)

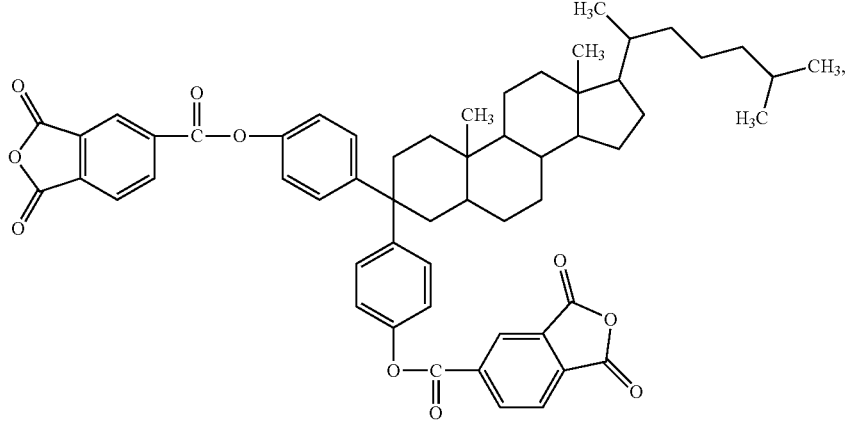
(II-3)

-continued

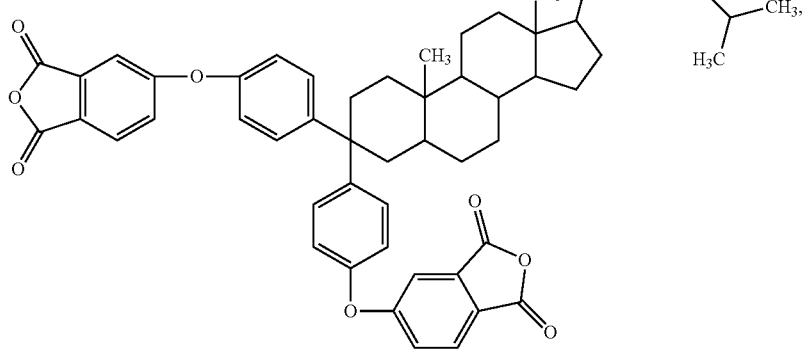
(II-4)

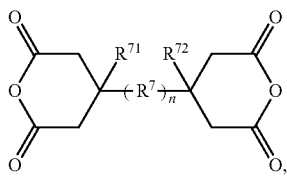
(II-5)

wherein R⁷ represents a divalent group having an aromatic ring structure; n represents an integer ranging from 1 to 2; and $R^{71}$ and $R^{72}$ may be the same or different, and independently represent hydrogen or an alkyl group, and

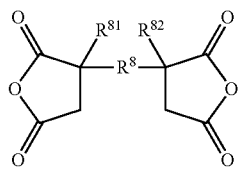
(II-6)

wherein $R^8$ represents a divalent group having an aromatic ring structure; and $R^{81}$ and $R^{82}$ maybe the same or different, and independently represent hydrogen or an alkyl group.

Preferably, the tetracarboxylic dianhydride represented by formula (II-5) is selected from

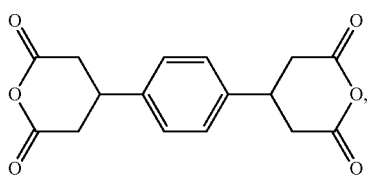
(II-5-1)

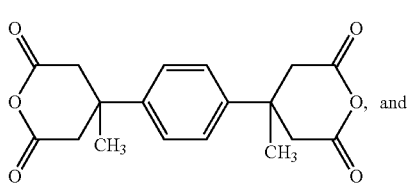
(II-5-2) and

-continued

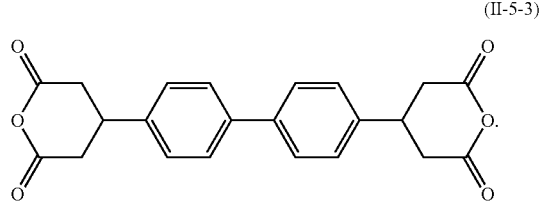
(II-5-3)

Preferably, the tetracarboxylic dianhydride represented by formula (II-6) is

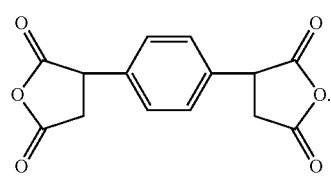
(II-6-1)

Preferred examples of the tetracarboxylic dianhydride compounds suitable for the present invention include, but are not limited to, 1,2,3,4-cyclobutanetetracarboxylic dianhydride, 1,2,3,4-cyclopentanetetracarboxylic dianhydride, 2,3,5-tricarboxycyclopentylacetic dianhydride, 1,2,4,5-cyclohexanetetracarboxylic dianhydride, 3,4-dicarboxy-1,2,3,4-tetrahydronaphthalene-1-succinic acid dianhydride, pyromellitic dianhydride, 3,3',4,4'-benzophenonetetracarboxylic dianhydride, and 3,3',4,4'-diphenylsulfonetetracarboxylic dianhydride.

Polyamic acid used for making the liquid crystal alignment agent of the present invention is obtained by subjecting the aforesaid tetracarboxylic dianhydride compound and the aforesaid diamine compound to a polycondensation reaction. The polycondensation reaction between the tetracarboxylic dianhydride compound and the diamine compound is conducted in an organic solvent at a temperature ranging from 0 to 100° C. for a period ranging from 1 to 24 hours to obtain a reaction solution containing the obtained polymer. The reaction solution is distillated under a reduced pressure in a distiller to obtain polyamic acid. Alternatively, the reaction solution can be treated by pouring it into a large amount of poor solvent to obtain a precipitate, which is then dried under a reduced pressure to obtain polyamic acid.

The tetracarboxylic dianhydride compound is used in an amount ranging preferably from 20 to 200 moles, more preferably from 30 to 120 moles based on 100 moles of the diamine compound.

The organic solvent for the polycondensation reaction may be the same as or different from the organic solvent used in the liquid crystal alignment agent. Furthermore, there is no particular limitation to the organic solvent for the polycondensation reaction as long as the organic solvent is able to dissolve the reactants and the products. Examples of the organic solvent for the polycondensation reaction include, but are not limited to, (1) aprotic polar solvents, such as 1-methyl-2-pyrrolidone, N,N-dimethylacetamide, N,N-dimethylformamide, dimethylsulfoxide, γ-butyrolactone, tetramethylurea, hexamethylphosphoric acid triamide, and the like; and (2) phenolic solvents, such as m-cresol, xylenol, phenol, halogenated phenols, and the like.

The organic solvent for the polycondensation reaction is used in an amount preferably from 200 to 2,000 parts by weight, and more preferably from 300 to 1,800 parts by weight, based on 100 parts by weight of a combination of the tetracarboxylic dianhydride compound and the diamine compound.

The aforementioned organic solvent for the polycondensation reaction can be used in combination with a poor solvent in such an amount that does not cause precipitation of the formed polymer. Examples of the poor solvent include, but are not limited to, (1) alcohols, such as methyl alcohol, ethyl alcohol, isopropyl alcohol, cyclohexanol, ethylene glycol, propylene glycol, 1,4-butanediol, triethylene glycol, or the like; (2) ketones, such as acetone, methyl ethyl ketone, methyl isobutyl ketone, cyclohexanone, or the like; (3) esters, such as methyl acetate, ethyl acetate, butyl acetate, diethyl oxalate, diethyl malonate, ethylene glycol ethyl ether acetate, or the like; (4) ethers, such as diethyl ether, ethylene glycol methyl ether, ethylene glycol ethyl ether, ethylene glycol n-propyl ether, ethylene glycol i-propyl ether, ethylene glycol n-butyl ether, ethylene glycol dimethyl ether, diethylene glycol dimethyl ether, or the like; (5) halogenated hydrocarbons, such as dichloromethane,1,2-dichloroethane,1,4-dichlorobutane, trichloroethane, chlorobenzene, o-dichlorobenzene, or the like; and (6) hydrocarbons, such as tetrahydrofuran, hexane, heptane, octane, benzene, toluene, xylene, or the like; or combinations thereof. The examples of the poor solvent may be used alone or in admixture of two or more.

The poor solvent is used in an amount preferably from 0 to 60 parts by weight, and more preferably from 0 to 50 parts by weight, based on 100 parts by weight of the diamine compound.

The organic solvent used in the polyamic acid dispersion can be the same as or different from the organic solvent used in the polycondensation reaction and/or the organic solvent used in the liquid crystal alignment agent, and thus is not further described. The amount of the organic solvent used in the polyamic acid dispersion can be adjusted according to the properties, such as viscosity or the like, of the polyamic acid dispersion and the properties, such as coating property and solid content, required for the subsequent application in the liquid crystal display element. The solid content of the polyamic acid dispersion can be adjusted according to the properties such as viscosity, volatility, or the like, and is in a range generally from 1 wt % to 15 wt %, preferably from 2 wt % to 15 wt %, and more preferably from 3 wt % to 15 wt %.

Preferably, the viscosity of the polyamic acid dispersion is in a range from 15 cps to 30 cps at a solid content of 6 wt % at a temperature of 25° C.

Polyimide Dispersion:

As described above, the polyimide dispersion used in the present invention is made by dispersing a polyimide compound in an organic solvent.

The polyimide compound useful in the present invention is obtained by further dehydration/ring-closure (imidization) processing of the aforesaid polyamic acid compound to transfer the amic acid functional group of the polyamic acid into the imido functional group.

The imidization processing of the polyamic acid compound is conducted by, for example, dissolving the polyamic acid compound in an organic solvent, and heating in the presence of a dehydrating agent and an imidization catalyst to implement a dehydration/ring-closing reaction. Heating temperature for the imidization processing is generally from 30 to 200° C., preferably from 40 to 150° C.

The organic solvent for the imidization processing may be the same as the organic solvent used in the liquid crystal alignment agent. The organic solvent for the imidization processing is used in an amount preferably from 200 to 2,000 parts by weight, and more preferably from 300 to 1,800 parts by weight, based on 100 parts by weight of the polyamic acid compound.

If the reaction temperature of the imidization processing is lower than 30° C., then the dehydration ring-closing reaction cannot be fully implemented and the imidization extent is unsatisfactory. If the reaction temperature exceeds 200° C., then the weight average molecular weight of the obtained polyimide compound is reduced.

When the imidization extent is less than 90%, the liquid crystal alignment agent produced from the polyimide compound has a better coating property.

Examples of the dehydrating agent suitable for the imidization processing include acid anhydride compounds, such as acetic anhydride, propionic anhydride, trifluoroacetic anhydride, and the like. The used amount of the dehydrating agent is preferably from 0.01 to 20 moles per mole of the polyamic acid compound. Examples of the catalyst suitable for the imidization processing include pyridine compounds, such as pyridine, trimethyl pyridine, dimethyl pyridine, or the like; and tertiary amines, such as triethylamine, or the like. The used amount of the catalyst is preferably from 0.5 to 10 moles per mole of the dehydrating agent.

The organic solvent used in the polyimide dispersion can be the same as or different from the organic solvent used in the liquid crystal alignment agent, and thus is not further described. The amount of the organic solvent used in the polyimide dispersion can be adjusted according to the properties, such as viscosity or the like, of the polyimide dispersion and the properties, such as film thickness uniformity and solid content, required for the subsequent application in the liquid crystal display element. The solid content of the polyimide dispersion can be adjusted according to the properties such as viscosity, volatility, or the like, and is in a range generally from 1 wt % to 15 wt %, preferably from 2 wt % to 15 wt %, and more preferably from 3 wt % to 15 wt %.

Preferably, the viscosity of the polyimide dispersion is in a range from 20 cps to 50 cps at a solid content of 6 wt % at a temperature of 25° C.

Preferably, the polymer mixture further includes a polyimide series block copolymer dispersion.

Polyimide Series Block Copolymer Dispersion:

The polyimide series block copolymer dispersion is made by dispersing a polyimide series block copolymer in an organic solvent.

The polyimide series block copolymer suitable for the present invention comprises polyamic acid block copolymer, polyimide block copolymer, polyamic acid-polyimide block copolymer, and combinations thereof.

In the synthesis reaction of the polyimide series block copolymer, the polyimide series block copolymer is obtained by further polycondensation reaction of compounds selected from the polyamic acid, the polyimide, diamine compounds, and tetracarboxylic dianhydride compounds in an organic solvent. The diamine compounds and the tetracarboxylic dianhydride compounds used for the synthesis reaction of the polyimide series block copolymer may be the same as the diamine compounds and the tetracarboxylic dianhydride compounds used for the preparation of the polyamic acid compound, and the organic solvent used for the synthesis reaction of the polyimide series block copolymer may be the same as the organic solvent used for the preparation of the liquid crystal alignment agent. The organic solvent for the synthesis reaction of the polyimide series block copolymer is used in an amount preferably from 200 to 2,000 parts by weight, and more preferably from 300 to 1,800 parts by weight, based on 100 parts by weight of a combination of the compounds used for synthesis reaction of the polyimide series block copolymer.

In the polycondensation reaction for the polyimide series block copolymer, the reaction temperature is generally from 0 to 200° C., and preferably from 0 to 100° C.

Preferably, non-limiting examples of the compounds used for the synthesis reaction of the polyimide series block copolymer include: (1) first and second polyamic acids which are different from each other in structures and terminal groups thereof; (2) first and second polyimides which are different from each other in structures and terminal groups thereof; (3) a polyamic acid and a polyimide which are different from each other in structures and terminal groups thereof; (4) a polyamic acid, a diamine compound, and a tetracarboxylic dianhydride compound, wherein at least one of the diamine compound and the tetracarboxylic dianhydride compound is structurally different from the one used in the polycondensation reaction for the polyamic acid; (5) a polyimide, a diamine compound, and a tetracarboxylic dianhydride compound, wherein at least one of the diamine compound and the tetracarboxylic dianhydride compound is structurally different from the one used in the polycondensation reaction for the polyimide; (6) a polyamic acid, a polyimide, a diamine compound, and a tetracarboxylic dianhydride compound, wherein at least one of the diamine compound and the tetracarboxylic dianhydride compound is structurally different from the ones used in the polycondensation reaction for the polyamic acid and the polycondensation reaction for the polyimide; (7) first and second polyamic acids, a diamine compound, and a tetracarboxylic dianhydride compound, wherein the first and second polyamic acids are structurally different from each other; (8) first and second polyimides, a diamine compound, and a tetracarboxylic dianhydride compound, wherein the first and second polyimides are structurally different from each other; (9) first and second polyamic acids and a diamine compound, wherein the first and second polyamic acids have anhydride terminal groups and are structurally different from each other; (10) first and second polyamic acids and a tetracarboxylic dianhydride compound, wherein the first and second polyamic acids have amino terminal groups and are structurally different from each other; (11) first and second polyimides and a diamine compound, wherein the first and second polyimides have anhydride terminal groups and are structurally different from each other; and (12) first and second polyimides and a tetracarboxylic dianhydride compound, wherein the first and second polyimides have amino terminal groups and are structurally different from each other.

The organic solvent used in the polyimide series block copolymer dispersion can be the same as or different from the organic solvent in the liquid crystal alignment agent, and thus is not further described. The amount of the organic solvent used in the polyimide series block copolymer dispersion can be adjusted according to the properties, such as viscosity or the like, of the polyimide series block copolymer dispersion and the properties, such as coating property and solid content, required for the subsequent application in the liquid crystal display element. The solid content of the polyimide series block copolymer dispersion can be adjusted according to the properties such as viscosity, volatility, or the like, and is in a range generally from 1 wt % to 15 wt %, preferably from 2 wt % to 15 wt %, and more preferably from 3 wt % to 15 wt %.

Additionally, the polyamic acid compound, the polyimide compound, and the polyimide series block copolymer used in the present invention can also be the polymers which are terminal-modified after an adjustment of molecular weight thereof. The terminal-modified polymers can be used to improve the coating property and the like of the liquid crystal alignment agent as long as they will not reduce the effects of the present invention. The process for synthesizing the terminal-modified polymers involves adding monofunctional compounds to the reaction system during the polycondensation reaction for the polyamic acid.

Examples of the monofunctional compounds include, but are not limited to, (1) monoanhydride compounds, such as maleic anhydride, phthalic anhydride, itaconic anhydride, n-decyl succinic anhydride, n-dodecyl succinic anhydride, n-tetradecyl succinic anhydride, n-hexadecyl succinic anhydride, and the like; (2) monoamine compounds, such as aniline, cyclohexylamine, n-butylamine, n-amylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-eicosylamine, and the like; and (3) monoisocyanate compounds, such as phenyl isocyanate, naphthylisocyanate, and the like.

Organic Solvent:

Preferably, the organic solvents used in the liquid crystal alignment agent of the present invention are selected from 1-methyl-2-pyrrolidone, γ-butyrolactone, γ-butyrolactam, 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diglycol dimethyl ether, diglycol diethyl ether, diglycol monomethyl ether, diglycol monoethyl ether, diglycol monomethyl ether acetate, diglycol monoethyl ether acetate, N,N-dimethylformamide, N,N-dimethylethanamide, and the like. The examples of the organic solvent may be used alone or in admixture of two or more.

Additives:

The additives such as functional silane containing compounds or epoxy group containing compounds may be added to the liquid crystal alignment agent of the present invention so as to improve adhesion of the liquid crystal alignment agent to the substrate to be applied as long as the intended properties of the liquid crystal alignment agent are not impaired. The additives may be used alone or in admixture of two or more.

Examples of the functional silane containing compounds include, but are not limited to, 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyltriethoxysilane, or the like.

Examples of the epoxy group containing compounds include, but are not limited to, ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerin diglycidyl ether, 2,2-dibromo-neopentyl glycol diglycidylether,1,3,5,6-tetragylcidyl-2,4-hexanediol, N,N,N',N'-tetragylcidyl-m-xylenediamine, 1,3-bis(N,N-digylcidylaminomethyl)cyclohexane, N,N,N',N'-tetragylcidyl-4,4'-diaminodiphenylmethane, N,N-gylcidyl-p-glycidoxyaniline, 3-(N-allyl-N-glycidyl)aminopropyltrimethoxysilane, 3-(N,N-diglycidyl)aminopropyltrimethoxysilane, or the like.

There is no specific limitation to the method for preparing the liquid crystal alignment agent of the present invention. The general mixing method can be used. For example, the liquid crystal alignment agent of the present invention can be made by mixing at least one polyamic acid dispersion, at least one polyimide dispersion, and optionally at least one polyimide series block copolymer dispersion to obtain a polymer mixture, which is then added with an organic solvent and optional additives at a temperature ranging from 0 to 200° C. followed by stirring until the polymer mixture is dissolved in the organic solvent.

The polyamic acid dispersion is in an amount ranging preferably from 50 to 90 parts by weight, and more preferably from 60 to 80 parts by weight, based on 100 parts by weight of the polymer mixture. The polyimide dispersion is in an amount ranging preferably from 10 to 50 parts by weight, and more preferably from 20 to 40 parts by weight, based on 100 parts by weight of the polymer mixture. The polyimide series block copolymer dispersion is in an amount ranging preferably from 2 to 50 parts by weight, and more preferably from 5 to 40 parts by weight, based on 100 parts by weight of the polymer mixture.

In order to provide better printability for the liquid crystal alignment agent, the organic solvent used for preparing the liquid crystal alignment agent is in an amount ranging preferably from 1,000 to 2,000 parts by weight, and more preferably from 1,200 to 2,000 parts by weight, based on 100 parts by weight of the polymer mixture.

The additives are in an amount ranging preferably from 0.5 to 50 parts by weight, and more preferably from 1 to 45 parts by weight, based on 100 parts by weight of the polymer mixture.

The viscosity of the liquid crystal alignment agent of the present invention is in a range preferably from 15 cps to 40 cps, more preferably from 20 cps to 40 cps, and most preferably from 20 cps to 30 cps at a temperature of 25° C. When the viscosity of the liquid crystal alignment agent of the present invention is in a range from 15 cps to 40 cps, the process stability of the liquid crystal alignment agent can be improved, and a liquid crystal display element having reduced or no defect (mura) can be obtained thereby.

The solid content in the liquid crystal alignment agent of the present invention is adjusted according to the properties such as viscosity, volatility, or the like. In order to provide better printability for the liquid crystal alignment agent, the solid content of the liquid crystal alignment agent ranges generally from 1 wt % to 15 wt %, preferably from 2 wt % to 15 wt %, and more preferably from 3 wt % to 15 wt %, based on a total weight of the liquid crystal alignment agent.

The static surface tension of the liquid crystal alignment agent of the present invention ranges preferably from 48 mN/m to 84 mN/m, and more preferably from 50 mN/m to 80 mN/m, at 25° C. When the static surface tension of the liquid crystal alignment agent of the present invention ranges from 48 mN/m to 84 mN/m at 25° C., the process stability of the liquid crystal alignment agent can be improved, and a liquid crystal display element having reduced or no defect (mura) can be obtained thereby.

Formation of Liquid Crystal Alignment Film:

The prepared liquid crystal alignment agent is applied to a substrate by a roller coating method, a spinner coating method, a printing method, an ink-jet method, or the like to form a coating film. The coating film is then treated by a pre-bake treatment, a post-bake treatment and an alignment treatment to obtain a liquid crystal alignment film.

The pre-bake treatment causes the organic solvent to volatilize. Temperature for the pre-bake treatment is generally from 30 to 120° C., preferably from 40 to 110° C., and more preferably from 50 to 100° C.

The post-bake treatment is carried out to conduct a dehydration/ring-closure (imidization) reaction. Temperature for the post-bake treatment is generally from 150 to 300° C., preferably from 180 to 280° C., and more preferably from 200 and 250° C.

The alignment treatment is carried out by rubbing the coating film in a certain direction with a roller wound with a cloth made of nylon, rayon, or cotton fiber according to the requirements.

Liquid Crystal Display Element:

Referring to FIG. 1, a preferred embodiment of a liquid crystal display element according to this invention includes a first unit 11, a second unit 12 spaced apart from the first unit 11, and a liquid crystal unit 13 disposed between the first unit 11 and the second unit 12.

The first unit 11 includes a first substrate 111, a first conductive film 112 formed on the first substrate 111, and a first liquid crystal alignment film 113 formed on the first conductive film 112 and opposite to the first substrate 111.

The second unit 12 includes a second substrate 121, a second conductive film 122 formed on the second substrate 121, and a second liquid crystal alignment film 123 formed on the second conductive film 122 and opposite to the second substrate 121. The first and second liquid crystal alignment films 113, 123 face toward each other.

The first and second substrates 111, 121 suitable for the present invention are made of a transparent material, for example, alkali-free glass, soda-lime glass, hard glass (Pyrex glass), quartz glass, polyethylene terephthalate, polybutylene terephthalate, polyether sulphone, polycarbonate, or the like commonly used in liquid crystal display devices. The first and second conductive films 112, 122 may be a film made of tin oxide ($SnO_2$), indium oxide-tin oxide ($In_2O_3$—$SnO_2$), or the like.

The first and second liquid crystal alignment films 113, 123 are respectively a film made of the liquid crystal alignment agent of the present invention, and are used for providing the liquid crystal unit 13 with a pretilt angle. The liquid crystal unit 13 can be activated by an electric field cooperatively produced by the first and second conductive films 112, 122.

Preferably, the liquid crystal unit 13 is made of a nematic liquid crystal material or a smectic liquid crystal material.

Preferably, the nematic liquid crystal material is selected from a twisted nematic liquid crystal, a super twisted nematic liquid crystal, or a vertical alignment liquid crystal.

Preferably, the twisted nematic liquid crystal or the super twisted nematic liquid crystal is a nematic liquid crystal material having positive dielectric anisotropy, examples of which include, but are not limited to, biphenyl liquid crystal, phenylcyclohexane liquid crystal, ester liquid crystal, terphenyl liquid crystal, biphenylcyclohexane liquid crystal, pyrimidine liquid crystal, dioxane liquid crystal, bicyclooctane liquid crystal, cubane liquid crystal, or the like. Furthermore, ferroelectric liquid crystals, such as cholesterol liquid crystals, for example, cholesteryl chloride, cholesteryl nonanoate, cholesteryl carbonate, or the like, chiral agents sold under the trade names C-15, CB-15 (manufactured by Merck Company), or p-decyloxybenzylidene-p-amino-2-methylbutyl cinnamate may be added to the above liquid crystals, as required.

Preferably, the vertical alignment liquid crystal is a nematic liquid crystal material having negative dielectric anisotropy. Examples of the nematic liquid crystal material having negative dielectric anisotropy include, but are not limited to, diaminobenzene liquid crystals, pyridazine liquid crystals, Shiff Base liquid crystals, azoxy liquid crystals, biphenyl liquid crystals, phenylcyclohexane liquid crystals, or the like.

When the liquid crystal alignment agent of the present invention is formed into a liquid crystal alignment film of a liquid crystal display element, a pretilt angle uniformity value (P) of less than 20%, preferably, from 1% to 15%, and more preferably from 1% to 10%, is obtained. When the pretilt angle uniformity value (P) is larger than 20%, a liquid crystal display element having no defect (mura) can not be obtained.

The pretilt angle uniformity value (P) is determined by a procedure including the steps of :

a) measuring pretilt angles at a plurality of areas (for example, an array of 3×3 or 4×4 areas) of a display surface of the liquid crystal display element; and b) determining the pretilt angle uniformity value (P) using the following formula:

$$P=(V_{max}-V_{min})/(2\times V_{ave})\times 100\%$$

wherein $V_{max}$ is a maximum value among the pretilt angles measured at the plurality of areas of the display surface, $V_{min}$ is a minimum value among the pretilt angles measured at the plurality of areas of the display surface, and $V_{ave}$ is an average value of the pretilt angles measured at the plurality of areas of the display surface.

Such a pretilt angle uniformity value (P) of less than 20% can be obtained by controlling the viscosity difference between the polyamic acid dispersion and the polyimide dispersion used for preparing the liquid crystal alignment agent. Specifically, as for the polyamic acid dispersion and the polyimide dispersion used for preparing the liquid crystal alignment agent, the viscosity of the polyamic acid dispersion and the viscosity of the polyimide dispersion satisfy the following relationship:

$$V_{A-2}-V_{A-1}\geq 4\ cps$$

wherein $V_{A-2}$ is viscosity of the polyimide dispersion measured at a solid content of 6 wt % at a temperature of 25° C., and $V_{A-1}$ is viscosity of the polyamic acid dispersion measured at a solid content of 6 wt % at a temperature of 25° C.

EXAMPLES

The following examples are provided to illustrate the preferred embodiments of the invention, and should not be construed as limiting the scope of the invention.

[Preparation of Polyamic Acid Dispersion (A-1)]:

Synthesis Example 1

A 500 ml four-necked conical flask equipped with a nitrogen inlet, a stirrer, a condenser and a thermometer was purged with nitrogen, and was added with p-diaminobenzene (referred as to R-1-4 hereinafter, 5.34 g, 0.05 mole) and N-methyl-2-pyrrolidone (referred as to NMP hereinafter, 80 g). Stirring was conducted at room temperature until R-1-4 was dissolved. 1,2,3,4-cyclobutanetetracarboxylic dianhydride (referred to as R-2-1 hereinafter, 9.81 g, 0.05 mole) and NMP (20 g) were then added, and reaction was conducted for 2 hours at room temperature. The reaction solution was then poured into water (1500 ml) to precipitate a polymer. The polymer obtained after filtering was washed with methanol and filtered three times, and was dried in a vacuum oven at 60° C. to obtain a polyamic acid polymer (P-1). The polyamic acid polymer (P-1) was formulated into a polyamic acid dispersion (A-1-1) having a solid content of 6 wt % by adding NMP. The viscosity of the polyamic acid dispersion (A-1-1) was measured. The result is shown in Table 1.

Synthesis Examples 2 to 7

Polyamic acid polymers were prepared according to the method of Synthesis Example 1 except that the diamine compounds and the tetracarboxylic dianhydride compounds shown in Table 1 were used instead of R-1-4 and R-2-1, respectively. The polyamic acid polymers were formulated into polyamic acid dispersions (A-1-2 to A-1-7) having a solid content of 6 wt % by adding NMP. The viscosities of the polyamic acid dispersions (A-1-2 to A-1-7) were measured. The results are shown in Table 1.

[Preparation of Polyimide Dispersion (A-2)]

Synthesis Example 8

A 500 ml four-necked conical flask equipped with a nitrogen inlet, a stirrer, a condenser and a thermometer was purged with nitrogen, and was added with a diamine compound having the aforesaid formula (I-2-1) (referred as to R-1-1 hereinafter, 2.25 g, 0.004 mole), R-1-4 (2.67 g, 0.025 mole), 4,4'-diaminodiphenylmethane (referred to as R-1-5 hereinafter, 4.16 g, 0.021 mole), and NMP (80 g). Stirring was conducted at room temperature until R-1-1, R-1-4, and R-1-5 were dissolved. R-2-1 (9.32 g, 0.048 mole) and NMP (20 g)

were then added, and reaction was conducted for 6 hours at room temperature NMP (97 g), acetic anhydride (5.61 g), and pyridine (19.75 g) were then added. Stirring was continued for 2 hours at 60° C. to conduct imidization reaction. The reaction solution was then poured into water (1500 ml) to precipitate a polymer. The polymer obtained after filtering was washed with methanol and filtered three times, and was dried in a vacuum oven at 60° C. to obtain a polyimide polymer (P-2). The polyimide polymer (P-2) was formulated into a polyimide dispersion (A-2-1) having a solid content of 6 wt % by adding NMP. The viscosity of the polyimide dispersion (A-2-1) was measured. The result is shown in Table 1.

Synthesis Examples 9 to 14

Polyimide polymers were prepared according to the method of Synthesis Example 8 except that the diamine compounds and the tetracarboxylic dianhydride compounds shown in Table 1 were used instead of the diamine compounds and the tetracarboxylic dianhydride compound used in Synthesis Example 8. The polyimide polymers were formulated into polyimide dispersions (A-2-2 to A-2-7) having a solid content of 6 wt % by adding NMP. The viscosities of the polyimide dispersions (A-2-2 to A-2-7) were measured. The results are shown in Table 1.

[Preparation of Polyimide Series Block Copolymer Dispersion (A-3)]

Synthesis Example 15

The polyamic acid dispersion (A-1-1) and the polyimide dispersion (A-2-1) obtained were mixed in a ratio of 1:1, and were stirred at 60° C. for 6 hours to conduct a copolymerization reaction. The reaction solution was then poured into water (1500 ml) to precipitate a polymer. The polymer obtained after filtering was washed with methanol and filtered three times, and was dried in a vacuum oven at 60° C. to obtain a polyimide series block copolymer (P-3-3). The polyimide series block copolymer (P-3-3) was formulated into a polyimide series block copolymer dispersion (A-3-1) having a solid content of 6 wt % by adding NMP. The viscosity of the polyimide series block copolymer dispersion (A-3-1) was measured to be 27 cps.

TABLE 1

| Components (moles) | | 1 A-1-1 | 2 A-1-2 | 3 A-1-3 | 4 A-1-4 | 5 A-1-5 | 6 A-1-6 | 7 A-1-7 | 8 A-2-1 | 9 A-2-2 | 10 A-2-3 | 11 A-2-4 | 12 A-2-5 | 13 A-2-6 | 14 A-2-7 |
|---|---|---|---|---|---|---|---|---|---|---|---|---|---|---|---|
| R-1 | R-1-1 | — | — | — | — | — | — | — | 8 | 2 | — | 8 | — | — | 8 |
| | R-1-2 | — | — | — | — | — | — | — | — | 4 | — | — | 6 | — | — |
| | R-1-3 | — | — | — | — | — | — | — | — | — | 80 | — | — | 80 | — |
| | R-1-4 | 100 | 50 | — | 70 | — | — | 100 | 50 | — | — | 92 | — | — | 92 |
| | R 1-5 | — | 50 | — | — | 100 | — | — | 42 | 94 | — | — | 70 | — | — |
| | R-1-6 | — | — | 100 | 30 | — | 100 | — | — | — | 20 | — | 24 | 20 | — |
| R-2 | R-2-1 | 100 | — | 50 | 101 | — | — | 98 | 96 | — | — | 100 | — | 50 | 103 |
| | R-2-2 | — | 100 | — | — | 102 | — | — | — | 97 | — | — | 100 | — | — |
| | R-2-3 | — | — | 50 | — | — | 103 | — | — | — | 98 | — | — | 50 | — |
| Viscosity (cps) (solid content: 6 Wt %) | | 23 | 23 | 24 | 21 | 19 | 17 | 40 | 28 | 36 | 45 | 25 | 24 | 25 | 18 |

Notes:
R-1: diamine compounds
R-1-1: a diamine compound represented by formula (I-2-1)
R-1-2: 5-[4-(4-n-pentylcyclohexyl)cyclohexyl]phenylmethylene-1,3-diaminobenzene,
R-1-3: 1,1-bis[4-4-aminophenoxy)phenyl]-4-(4-ethylphenyl)cyclohexane
R-1-4: p-diaminobenzene
R-1-5: 4,4'-diaminodiphenylmethane
R-1-6: 4,4'-diaminodiphenylether
R-2: tetracarboxylic dianhydride compounds
R-2-1: 1,2,3,4-cyclobutanetetracarboxylic dianhydride
R-2-2: 3,4-dicarboxy-1,2,3,4-tetrahydronaphthalene-1-succinic acid dianhydride
R-2-3: 1,2,4,5-cyclohexanetetracarboxylic dianhydride

[Preparation of Liquid Crystal Alignment Agent, Liquid Crystal Alignment Film, and Liquid Crystal Display Element]

Example 1

85 parts by weight of the polyamic acid dispersion (A-1-1) of Synthesis Example 1, 15 parts by weight of the polyimide dispersion (A-2-1) of Synthesis Example 8, 1000 parts by weight of 1-methyl-2-pyrrolidone (referred to as B-1 hereinafter), 500 parts by weight of ethylene glycol n-butyl ether (referred to as B-2 hereinafter), and 5 parts by weight of N,N,N',N'-tetraglycidyl-4,4'-diaminodiphenylmethane (referred to as C-1 hereinafter) were stirred at room temperature to form a liquid crystal alignment agent.

The liquid crystal alignment agent was coated onto two glass substrates each having an ITO (indium-tin-oxide) conductive film using a printing machine (manufactured by Japan Nissha Printing Co., Ltd., Model S15-036), after which the glass substrates coated with the alignment agent solution were pre-baked on a heating plate at a temperature of 100° C. for five minutes, and were then post-baked in a hot air circulation baking oven at a temperature of 220° C. for 30 minutes followed by an alignment treatment to form a liquid crystal alignment film on each of the glass substrates.

Thermo-compression adhesive agent was applied to one of the glass substrates formed with the liquid crystal alignment films, and spacers of 4 μm were sprayed on the other of the glass substrates formed with the liquid crystal alignment films. The two glass substrates were aligned and bonded together in a vertical direction, and then 10 kg of pressure was applied using a thermo-compressor to carry out thermo-compression at 150° C. Liquid crystal was poured using a liquid crystal pouring machine (manufactured by Shimadzu Corporation, Model ALIS-100X-CH), ultraviolet light was then used to harden a sealant to seal the liquid crystal injection hole, and an annealing treatment was conducted in an oven at 60° C. for 30 minutes, thereby manufacturing a liquid crystal display element. The liquid crystal alignment agent and the liquid crystal display element were evaluated according to the following evaluation methods. The results are shown in Table 2.

Examples 2-11 and Comparative Examples 1-7

Examples 2-11 and Comparative Examples 1-7 were conducted in a manner identical to Example 1 using the polymers, the organic solvents, and the additives shown in Table 2 to prepare the liquid crystal alignment agents, the liquid crystal alignment films, and the liquid crystal display elements. The liquid crystal alignment agents and the liquid crystal display elements thus obtained were evaluated according to the following evaluation methods. The results are shown in Table 2.

[Evaluation Items]

1. Viscosity:

Viscosity of each of the polyamic acid dispersions prepared in Synthesis Examples 1-7, the polyimide dispersions prepared in Synthesis Examples 8-14, the polyimide series block copolymer dispersion prepared in Synthesis Example 15, the liquid crystal alignment agents prepared in Examples 1-11, and the liquid crystal alignment agents prepared in Comparative Examples 1-7 was determined using an ELD-type viscometer (manufactured by Toki Sangyo Co., Ltd., RE-80L) at 20 rpm at 25° C. The results are listed in Table 2 in a unit of cps.

2. Static Surface Tension:

The static surface tension of each of the liquid crystal alignment agents prepared in Examples 1-11 and Comparative Examples 1-7 was determined using a surface tension meter (manufactured by Kyowa Chemical Industry CO., Ltd., DIGI-O-MATIC ESB-IV) in a manner that 30 ml of each of the liquid crystal alignment agents was taken on a small petri dish (diameter of 5 cm), and the static surface tension at one minute elapsing after a platinum plate was brought to contact therewith was recorded.

3. Pretilt Angle Uniformity Value (P):

An area of 3×3 cm² of a display surface of each of the liquid crystal display elements made in Examples 1-11 and Comparative Examples 1-7 was divided into nine sub-areas (i.e., an array of 3×3 sub-areas). The pretilt angle of each of the nine sub-areas was measured so as to obtain $V_{max}$ (a maximum value among the measurd pretilt angles), $V_{min}$ (a minimum value among the measured pretilt angles), and $V_{ave}$ (an average value of the measured pretilt angles). The pretilt angle uniformity value (P) was determined using the following formula:

$$P = (V_{max} - V_{min})/(2 \times V_{ave}) \times 100\%.$$

4. Defect (Mura) Detection:

Each of the liquid crystal display elements made in Examples 1-11 and Comparative Examples 1-7 was detected using a light-on testing method. Each of the liquid crystal display elements was irradiated using a standard C-light source as a backlight source, and was observed through a polarizer to detect appearance of defects such as a frame defect and/or a line defect. Evaluation was conducted according to the following standards:

⊚: No defect was observed
○: Slight defect was observed
Δ: Apparent defect was observed
×: Serious defect was observed 5. Process Stability:

Each of the liquid crystal alignment agents of Examples 1-11 and Comparative Examples 1-7 was used to make five liquid crystal display elements by pre-baking at five different pre-baking temperatures (i.e., 80° C., 90° C., 100° C, 110° C., and 120° C). The pretilt angle uniformity values (P) of the five liquid crystal display elements were determined according to the aforesaid evaluation item 3. Variation of the pretilt angle uniformity values (P) of the five liquid crystal display elements made from each of the liquid crystal alignment agents was determined according to the following formula:

Variation of $P = (P_{max} - P_{min}) \times 100\%.$

Process stability was evaluated according to the following standards:

⊚: Variation of P≤2%
○: 2%<Variation of P≤5%
Δ: 5%<Variation of P≤10%
×: Variation of P>10%

TABLE 2

| Components | | Examples | | | | | | | | | | | Comparative Examples | | | | | | |
| --- | --- | --- | --- | --- | --- | --- | --- | --- | --- | --- | --- | --- | --- | --- | --- | --- | --- | --- | --- |
| | (pbw) | 1 | 2 | 3 | 4 | 5 | 6 | 7 | 8 | 9 | 10 | 11 | 1 | 2 | 3 | 4 | 5 | 6 | 7 |
| A | A-1-1 (23 cps) | 85 | | | | | | | | 40 | 60 | | 85 | | 85 | | | | |
| | A-1-2 (23 cps) | | 80 | | | | | | 80 | 35 | | | | 80 | | | | | |
| | A-1-3 (24 cps) | | | 75 | | | | | | | | | | | 75 | | | | |
| | A-1-4 (21 cps) | | | | 85 | | | | | | 10 | 40 | | | | | 75 | | |
| | A-1-5 (19 cps) | | | | | 80 | | | | | | 40 | | | | | | | |
| | A-1-6 (17 cps) | | | | | | 75 | 85 | | | | | | | | | | | |
| | A-1-7 (40 cps) | | | | | | | | | | | | | | | | | 80 | 70 |
| | A-2-1 (28 cps) | 15 | | | | | | | 10 | | | 10 | | | | | | | |
| | A-2-2 (36 cps) | | 20 | | | | | | | | | 10 | | | | | | | 30 |
| | A-2-3 (45 cps) | | | 25 | | | | 15 | | 15 | 30 | | | | | | | | |
| | A-2-4 (25 cps) | | | | 15 | | | | | 10 | | | 15 | | | | | | |
| | A-2-5 (24 cps) | | | | | 20 | 10 | | | | | | | 20 | | 20 | | | |
| | A-2-6 (25 cps) | | | | | | 15 | | | | | | | | 25 | | | | |
| | A-2-7 (18 cps) | | | | | | | | | | | | | | | | 15 | | 25 |
| | A-3-1 (27 cps) | | | | | | | | 10 | | | | | | | | | | |

TABLE 2-continued

| Components (pbw) | | Examples | | | | | | | | | | | Comparative Examples | | | | | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 | 5 | 6 | 7 |
| B | B-1 | 1000 | 1000 | | 1800 | 1000 | 1000 | 1000 | 1000 | 1000 | 1000 | 1000 | 1000 | 1000 | 1000 | 1000 | 1000 | 1000 | 1000 |
| | B-2 | 500 | | 500 | | 300 | 500 | 500 | 500 | 500 | 500 | 500 | 500 | 500 | 500 | 500 | 500 | 500 | 500 |
| | B-3 | | 500 | 1000 | | 300 | | | | | | | | | | | | | |
| C | C-1 | 5 | | 5 | | | 5 | | | 5 | 5 | 5 | 5 | | | 5 | | | | |
| | C-2 | | 5 | 5 | | 5 | | 5 | 5 | | 5 | | | 5 | 5 | | | | | |
| | Viscosity of alignment agents (cps) | 23 | 28 | 33 | 15 | 18 | 20 | 21 | 25 | 22 | 38 | 23 | 16 | 18 | 20 | 14 | 31 | 12 | 42 |
| | Static surface tension of alignment agents | 63 | 70 | 78 | 45 | 50 | 53 | 61 | 65 | 63 | 84 | 64 | 51 | 54 | 57 | 44 | 75 | 41 | 86 |
| | P value (%) | 10 | 6 | 4 | 18 | 15 | 11 | 2 | 9 | 7 | 6 | 5 | 25 | 24 | 24 | 28 | 26 | 30 | 33 |
| Evaluation results | Defect (mura) | ⊚ | ⊚ | ⊚ | ○ | ○ | ○ | ⊚ | ⊚ | ⊚ | ⊚ | ⊚ | X | X | X | X | X | X | X |
| | Process stability | ⊚ | ⊚ | ○ | ○ | ⊚ | ⊚ | ⊚ | ⊚ | ⊚ | ○ | ⊚ | Δ | Δ | Δ | X | X | X | X | pbw: part by weight
A: polymer mixtures
B: organic solvents
C: additives
B-1: 1-methyl-2-pyrrolidone
B-2: ethylene glycol n-butyl ether
B-3: N,N-dimethylacetamide
C-1: N,N,N',N'-tetraglycidyl-4,4'-diaminodiphenylmethane
C-2: N,N-glycidyl-p-glycidoxyaniline As shown in Table 2, in Examples 1-11, the pretilt angle uniformity values are all less than 20% (i.e., from 2% to 18%), the viscosity values of the liquid crystal alignment agents range from 15 cps to 40 cps, and the static surface tension values of the liquid crystal alignment agents range from 48 mN/m to 84 mN/m. Good process stability is obtained and there is no defect appeared on the display surface of the liquid crystal display element. However, in Comparative Examples 1-7, the pretilt angle uniformity values are more than 20% (i.e., from 24% to 33%). The process stability is unsatisfactory, and severe defects (mura) appeared on the display surface of the liquid crystal display element.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A liquid crystal alignment agent, comprising:
a polyamic acid dispersion; and
a polyimide dispersion,
viscosity of said polyamic acid dispersion and viscosity of said polyimide dispersion satisfying the following relationship:

$$V_{A-2} - V_{A-1} \geq 4 \text{ cps}$$

wherein
$V_{A-2}$ is viscosity of said polyimide dispersion measured at a solid content of 6 wt % at a temperature of 25° C., wherein $V_{A-2}$ ranges from 20 to 50 cps, and
$V_{A-1}$ is viscosity of said polyamic acid dispersion measured at a solid content of 6 wt % at a temperature of 25° C., wherein $V_{A-1}$ ranges from 15 to 30 cps.

2. The liquid crystal alignment agent as claimed in claim 1, wherein the liquid crystal alignment agent has a viscosity measured at a solid content of 6 wt % at a temperature of 25° C., which ranges from 15 to 40 cps.

3. The liquid crystal alignment agent as claimed in claim 2, wherein the viscosity of the liquid crystal alignment agent ranges from 20 to 40 cps.

4. The liquid crystal alignment agent as claimed in claim 3, wherein the viscosity of the liquid crystal alignment agent ranges from 20 to 30 cps.

5. The liquid crystal alignment agent as claimed in claim 1, wherein the liquid crystal alignment agent has a static surface tension value ranging from 48 to 84 mN/m.

6. A liquid crystal alignment film formed from the liquid crystal alignment agent as claimed in claim 1.

7. A liquid crystal display element, comprising the liquid crystal alignment film as claimed in claim 6.

8. The liquid crystal display element as claimed in claim 7, wherein a pretilt angle uniformity value (P) of less than 20% is obtained when the pretilt angle uniformity value (P) is determined by a procedure including the steps of:
a) measuring pretilt angles at a plurality of areas of a display surface of the liquid crystal display element; and
b) determining the pretilt angle uniformity value (P) using the following formula:

$$P = (V_{max} - V_{min})/(2 \times V_{ave}) \times 100\%$$

wherein
$V_{max}$ is a maximum value among the pretilt angles measured at the plurality of areas of the display surface,
$V_{min}$ is a minimum value among the pretilt angles measured at the plurality of areas of the display surface, and
$V_{ave}$ is an average value of the pretilt angles measured at the plurality of areas of the display surface.

9. The liquid crystal display element as claimed in claim 8, wherein the pretilt angle uniformity value (P) ranges from 1 to 15%.

10. The liquid crystal display element as claimed in claim 9, wherein the pretilt angle uniformity value (P) ranges from 1 to 10%.

* * * * *